US010032317B2

(12) United States Patent
Singh et al.

(10) Patent No.: US 10,032,317 B2
(45) Date of Patent: Jul. 24, 2018

(54) INTEGRATED FLEET VEHICLE MANAGEMENT SYSTEM

(71) Applicant: Accenture Global Services Limited, Dublin (IE)

(72) Inventors: Paul Sundar Singh, Tamil Nadu (IN); Vallinayagam Shunmugam, Tamil Nadu (IN); Karthik Kanthimathinathan, Tamil Nadu (IN); Priyadharshini Mohan, Tamil Nadu (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 416 days.

(21) Appl. No.: 14/668,053

(22) Filed: Mar. 25, 2015

(65) Prior Publication Data

US 2016/0232721 A1 Aug. 11, 2016

(30) Foreign Application Priority Data

Feb. 11, 2015 (IN) ............................ 671/CHE/2015

(51) Int. Cl.

| | |
|---|---|
| ***G06F 17/30*** | (2006.01) |
| ***G07C 5/00*** | (2006.01) |
| ***G07C 5/08*** | (2006.01) |

(52) U.S. Cl.

CPC ........... *G07C 5/008* (2013.01); *G07C 5/0825* (2013.01)

(58) Field of Classification Search

CPC .............................. G07C 5/008; G07C 5/0825

See application file for complete search history.

(56) References Cited

U.S. PATENT DOCUMENTS

| | | | | |
|---|---|---|---|---|
| 8,239,252 | B2 | 8/2012 | Wellman | |
| 8,751,290 | B2 | 6/2014 | Schullian et al. | |
| 8,924,241 | B2 | 12/2014 | Grosso | |
| 9,286,736 | B2 | 3/2016 | Punjabi et al. | |
| 2005/0060070 | A1 * | 3/2005 | Kapolka | G07C 5/008 701/31.4 |
| 2005/0065678 | A1 | 3/2005 | Smith et al. | |
| 2006/0287783 | A1 * | 12/2006 | Walker | H04Q 9/00 701/31.4 |
| 2014/0074345 | A1 | 3/2014 | Gabay et al. | |

(Continued)

FOREIGN PATENT DOCUMENTS

WO 2014079626 5/2014

OTHER PUBLICATIONS

INET beyond standard, "Pinpoint Positioning With Telematics", The Inet Transportation Management System (TMS), downloaded date Nov. 2014, 7 pages.

(Continued)

*Primary Examiner* — Leslie Wong
(74) *Attorney, Agent, or Firm* — Mannava & Kang, P.C.

(57) ABSTRACT

An integrated fleet vehicle management system provides remote management and diagnostics and analysis of vehicles. The system provides integration across many layers including on board units (OBUs) in vehicles, a telematics layer collecting OBU data, enterprise resource planning (ERP) applications, a data and analytics layer platform including data storage, and a mobility platform. The above integration enables management and diagnostics of vehicles and analysis of vehicle data for servicing and determining productivity.

20 Claims, 9 Drawing Sheets

(56) References Cited

U.S. PATENT DOCUMENTS

| | | | | |
|---|---|---|---|---|
| 2014/0095214 | A1* | 4/2014 | Mathe | G06Q 40/08 705/4 |
| 2014/0249714 | A1* | 9/2014 | Gormley | G06Q 30/0621 701/36 |
| 2014/0279707 | A1 | 9/2014 | Joshua et al. | |
| 2015/0302667 | A1* | 10/2015 | Punjabi | G06Q 30/016 701/31.4 |
| 2015/0348058 | A1 | 12/2015 | Liu et al. | |
| 2016/0086391 | A1* | 3/2016 | Ricci | G07C 5/008 701/29.3 |

OTHER PUBLICATIONS

AVLView.com, “Real time tracking with GPS/GPRS”, download date Nov. 21, 2014, 6 pages. <http://avlview.com/real-time-tracking>.

Trimble. Transport & Logistics, “ERP/TMS Integration”, downloaded date Nov. 21, 2014, 1 page. <http://210.210.24.107/TMT/erp_tms_integration.php>.

fleetilla, “fleetML—an XML Interface to Vehicle Location Information”, downloaded on Nov. 21, 2014, 2 pages. <http://www.fleetilla.com/fl1850-ws.asp>.

Telepath, “Telemetric-Online Dashboard Reporting”, downloaded on Nov. 21, 2014, 1 page. <http://www.telepath.uk.com/#!telemetrics/c1lb>.

SAP HANA, “Telematics for Manufacturing Industry-Rapid Deployment Solution”, downloaded on Nov. 2014, 8 pages.

SAP HANA, “Telematics for Manufacturing Industry-TELEMATIC-Measure.Analyse.Predict”, downloaded on Nov. 2014, 10 pages.

Softeal, “ERP Integration”, downloaded on Nov. 21, 2014, 1 page. <http://www.softeal.com/en/Sayfalar/Cozumlerimiz/Default.aspx>.

TMW, “TMT Fleet Maintenance Software”, downloaded on Nov. 21, 2014, 2 pages. <http://fleets.tmwsystems.com/fleet-maintenance-windows>.

Zora, “GPS Vehicle Tracking Solutions—Zora InVehicle Products”, downloaded on Nov. 21, 2014, 1 page. <http://www.xora.com/products/xora-invehicle/>.

“Fleeet Management System module for Odoo OpenERP (FMS)”, downloaded on Nov. 21, 2014, 6 pages. <http://pragtech.co.in/labs/verticals/odoo-openerp-fleet.html >.

Tomtom-Telematics, “How does GPS for vehicle tracking systems work?”, downloaded on Nov. 21, 2014, 2 pages. <http://business.tomtom.com/en_gb/fleet-management/vehicle-tracking/how-does-it-work/>.

ATI, “News Release: Maps BI and Assured Telematics Partnership to Help Improve Driver Safety and Reduce Fuel Costs for Fleets”, Apr. 8, 2014, 3 pages.

Johannes Paefgen, et al., “Evaluation and aggregation of pay-as-you-drive insurance rate factors: A classification analysis approach”, Decision Support Systems, Jun. 12, 2013, pp. 192-201.

* cited by examiner

FIG. 6
My Dashboard
Logout
High Priority Tickets (1)
Ticket No.
Description
Priority
Location
Map
1000287225
Problems with the Exhaust
Medium
Florida
My Assignments (6)
Ticket No.
Description
Priority
Location
Map
1000287224
Flat Tire
Low
Missouri
1000287227
Electrical Unit Failure
Low
Florida
1000287230
Spark Plug Maintenance
Medium
Missouri
My Dashboard
My Service

INTEGRATED FLEET VEHICLE MANAGEMENT SYSTEM

PRIORITY

This patent application is a non-provisional which claims priority under 35 U.S.C. 119(a)-(d) to Indian Application Serial Number 671/CHE/2015, filed Feb. 11, 2015, and entitled "INTEGRATED FLEET VEHICLE MANAGEMENT SYSTEM", which is incorporated by reference in its entirety.

BACKGROUND

The basic principles of fleet vehicle management range from acquiring vehicles to conducting daily operations with the vehicles to maintenance and to disposal. In the heavy equipment sector of fleet vehicles, fleet managers often manage and run different models of fleet vehicles that have different capacities and capabilities based on the job requirements. The vehicle operators and service managers try to monitor and conduct frequent checks of the vehicles, and generate periodic reports for maintenance. However, monitoring and maintaining the vehicles, and minimizing idle time of the vehicles are a challenge.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
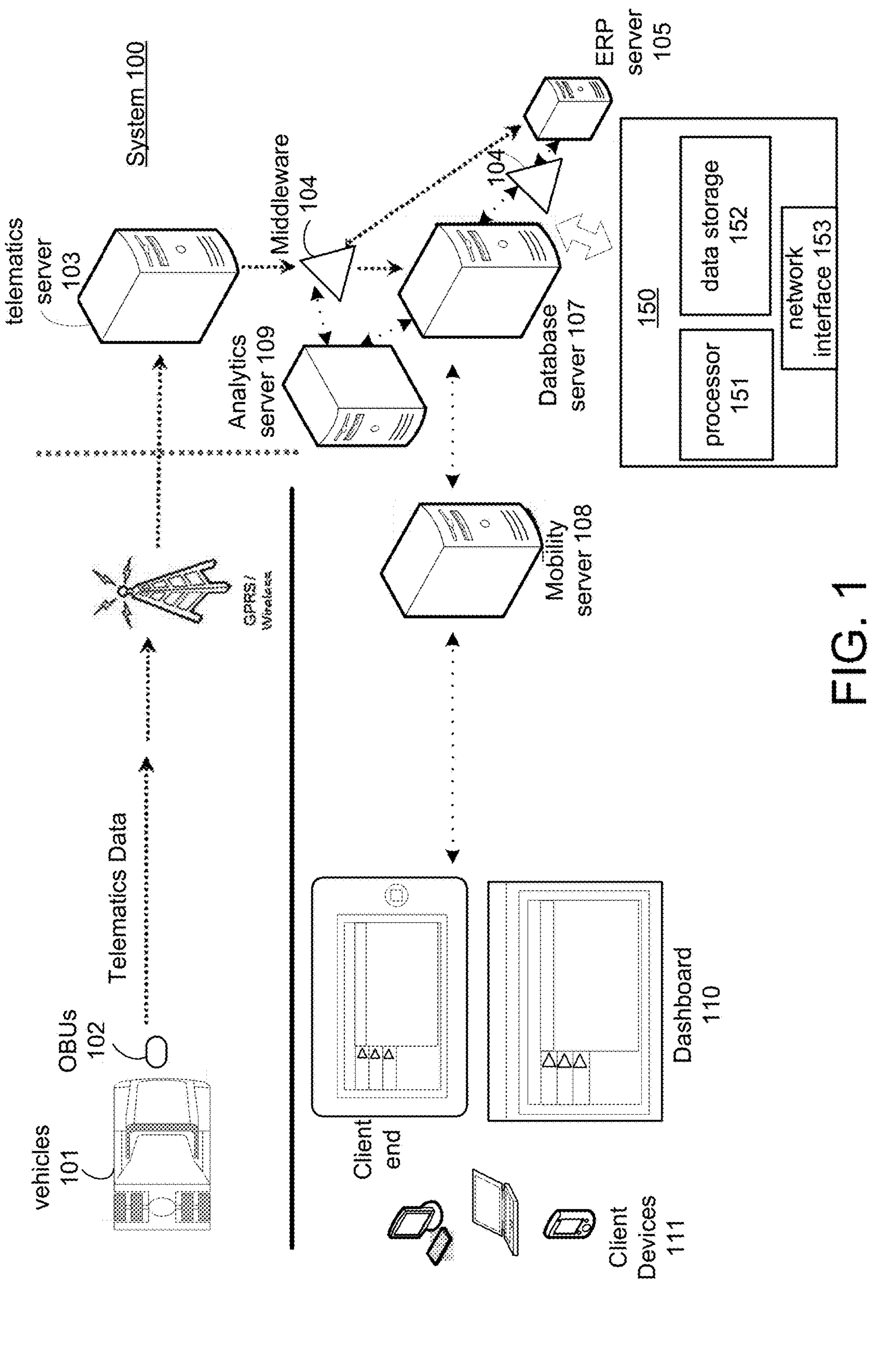
FIG. 1 illustrates an integrated fleet vehicle management system, according to an embodiment.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to embodiments described herein, an integrated fleet vehicle management system provides remote management and diagnostics and analysis of vehicles. The system provides integration across many layers including on board units (OBUs) in vehicles, a telematics layer collecting OBU data, enterprise resource planning (ERP) applications, a data and analytics layer platform including data storage, and a mobility platform. The above integration enables strategic management and diagnostics of vehicles and improved analysis of vehicle data that facilitates machine productivity and improvement of vehicle performance and utilization and provides a machine-to-mobile system that allows different platforms to communicate for fleet vehicle management. The system provides many functionalities for vehicles, including vehicle tracking, repair and spare parts availability, service scheduling, on-call support, diagnostics and warranty support. Also, the system generates a dashboard that shows vehicle metrics, current and historic, and shows predictions and recommendations for vehicle maintenance generated from analyzing vehicle data.

Current fleet vehicle systems may use telematics to capture data from vehicles, for example, wirelessly, over a network. A technical problem of current vehicle telematics systems is that they do not integrate with other systems. For example, vehicle telematics systems are typically company specific, so a telematics system made by a company typically only gathers data from vehicles that are made by that company. These systems typically can't gather data from vehicles made by other companies. Furthermore, these systems typically cannot interact with ERP systems and other external systems.

The integrated fleet vehicle management system of the embodiments of the present application interacts with many platforms and systems and can analyze vehicle data and present the data in real time via hand held devices. An integration subsystem facilitates communication with vehicles of different manufacturers and types, and integrates with ERP systems, a data and analytic platforms, a mobility platform, and other systems to provide the functionality described above and described in further detail below.

Furthermore, the integrated fleet vehicle management system can accommodate vehicles in the heavy equipment industry. These vehicles present additional challenges that may not be present in typical fleet vehicles. For example, the heavy equipment fleet vehicles often include different types of vehicles that have different capacities and different uses and are made by different manufacturers. For example, heavy equipment construction vehicles may include dump trucks of varying capacities, bulldozers of varying capacities, cranes of varying capacities, etc. Different manufacturers may provide the different types of vehicles or different manufacturers may provide the same type of vehicles of varying capacities. The integrated fleet vehicle management system can integrate vehicle telematics data from all these vehicles even if provided by different manufacturers. Furthermore, the integrated fleet vehicle management system can monitor rental of these vehicles to determine if the vehicles are being used in accordance with constraints specified in the rental agreements. Additionally, the integrated fleet vehicle management system can implement vehicle maintenance and security alerts, which may be more stringent for heavy industry vehicles for safety reasons.

FIG. 1 illustrates an integrated fleet vehicle management system 100, according to an embodiment. The integrated fleet vehicle management system 100 may be used to manage heavy equipment vehicles that may be part of a fleet and the system 100 can store information for the entire fleet of vehicles. However, the system 100 is not limited to managing heavy equipment vehicles and may be used to manage any type of vehicle, such as automobiles, trucks, aircraft, motorcycles, bicycles, etc., and the managed vehicles need not be part of a fleet. Also, the system may be used to manage equipment other than vehicles for which data about the equipment can be collected and used to manage the equipment.

The system 100 may include a telematics server 103 that receives telematics data from OBUs 102 in vehicles 101. The data may be pushed from the OBUs 102 or pulled by the telematics server 103, which may request the telematics data from the OBUs 102. To pull the telematics data, the telematics server 103 may poll the OBUs 102. The OBUs 102 may transmit the telematics data to the telematics server 103 via one or more networks, which may be wireless (e.g., cellular, satellite, Wi-Fi, etc.) and/or wired. The networks may be public networks, such as the Internet, and/or private networks.

The telematics data collected by the telematics server 103 may include any data collected by vehicle sensors or equipment sensors. The sensor data may measure engine fluid levels, fuel consumption, engine temperature, hydraulic fluid levels, tire pressure, battery life, and other vehicle and equipment metrics that are measurable with sensors. The telematics data may include vehicle location information. The telematics data may include information on whether the vehicle is being used according to predetermined constraints, such as limits on capacity of a bull dozer, dump truck or other hauling vehicle, or height of a crane, etc. For example, sensors may measure weight of a load on the vehicle or other metrics associated with operation of the vehicle to determine if the vehicle is being used according to guidelines or predetermined requirements. The telematics data may include service information generated by the OBUs 102 and any other information generated by the OBUs 102. The collected telematics data may be analyzed and utilized by a data and analytics platform, ERP applications, including customer relationship management (CRM), and other applications.

The following is a high-level description of the back-end systems of the system 100. A more detailed description of these back-end systems is provided with respect to FIG. 2 and other figures described below. In addition to the telematics server 103, the system 100 may include middleware 104, ERP server 105, database server 107, mobility server 108, and analytics server 109. The middleware 104 provides integration between the various platforms and servers and is further described below. The ERP server 105 may include application servers that host ERP applications, including a CRM application. The ERP applications may utilize the telematics data and may identify contact information for entities that are utilizing or responsible for managing the vehicles 101. The ERP applications may generate service tickets, check warranty information, order parts, and perform other vehicle-related functions based on the telematics data. The database server 107 stores the telematics data. In one example, the database server 107 may handle both high transaction rates and complex query processing on the stored telematics data.

The mobility server 108 is a mobility platform that facilitates interaction between the client devices 111 and the system 100. The mobility server 108 may provide a dashboard 110, including a graphical user interface, for display on the client devices 111. For example, the mobility server 108 provides an Internet portal for the client devices 111 to access the system 100 through the Internet. The dashboard 110 may be accessible via a browser. The mobility server 110 may include a web server. The dashboard 110 may show a service ticket and vehicle information for example to a service technician. The dashboard 110 may receive a drill-down query for additional information for the vehicle, and the user is authenticated, and the mobility layer 202 sends the query to the analytics and/or database servers to retrieve the additional information for the vehicle. The dashboard 110 presents the additional information via a screen in the dashboard if the user is authenticated. The dashboard 110 provides a consolidated view of information from multiple environments, including the ERP applications 110 and the analytics and database layers 203 and 204. The client devices 111 may include cellular phones, laptops, desktops, tablets, workstations, or other types of devices and computer systems. The analytics server 109 processes the telematics data and makes vehicle service and diagnostic determinations, and facilitates the scheduling of maintenance, managing rental and warranty instances, and performs a variety of other functions for managing the vehicles 101.

A single server is shown for each of the telematics server 103, ERP server 105, database server 107, mobility server 108 and analytics server 109. Multiple servers may be used for each of these servers, and the servers may be connected via one or more networks. Also, the middleware 104 may include software hosted by one or more servers.

An example of hardware that may be used for any of the servers is shown as 150, which includes a processor 151, data storage 152 and network interface 103. The processor 151 is an integrated circuit. The processor 151 may execute software or firmware or comprise custom processing circuits, such as an application-specific integrated circuit (ASIC) or field-programmable gate array (FPGA). The data storage 152 includes volatile and/or nonvolatile data storage that can store data and software or firmware including machine readable instructions. The software or firmware may include subroutines or applications that perform the functions of the system 100 and/or runs applications that may utilize the data from the system 100. The server 150 also includes a network interface 153 to communicate with other servers or devices via a network.

Figure 2:
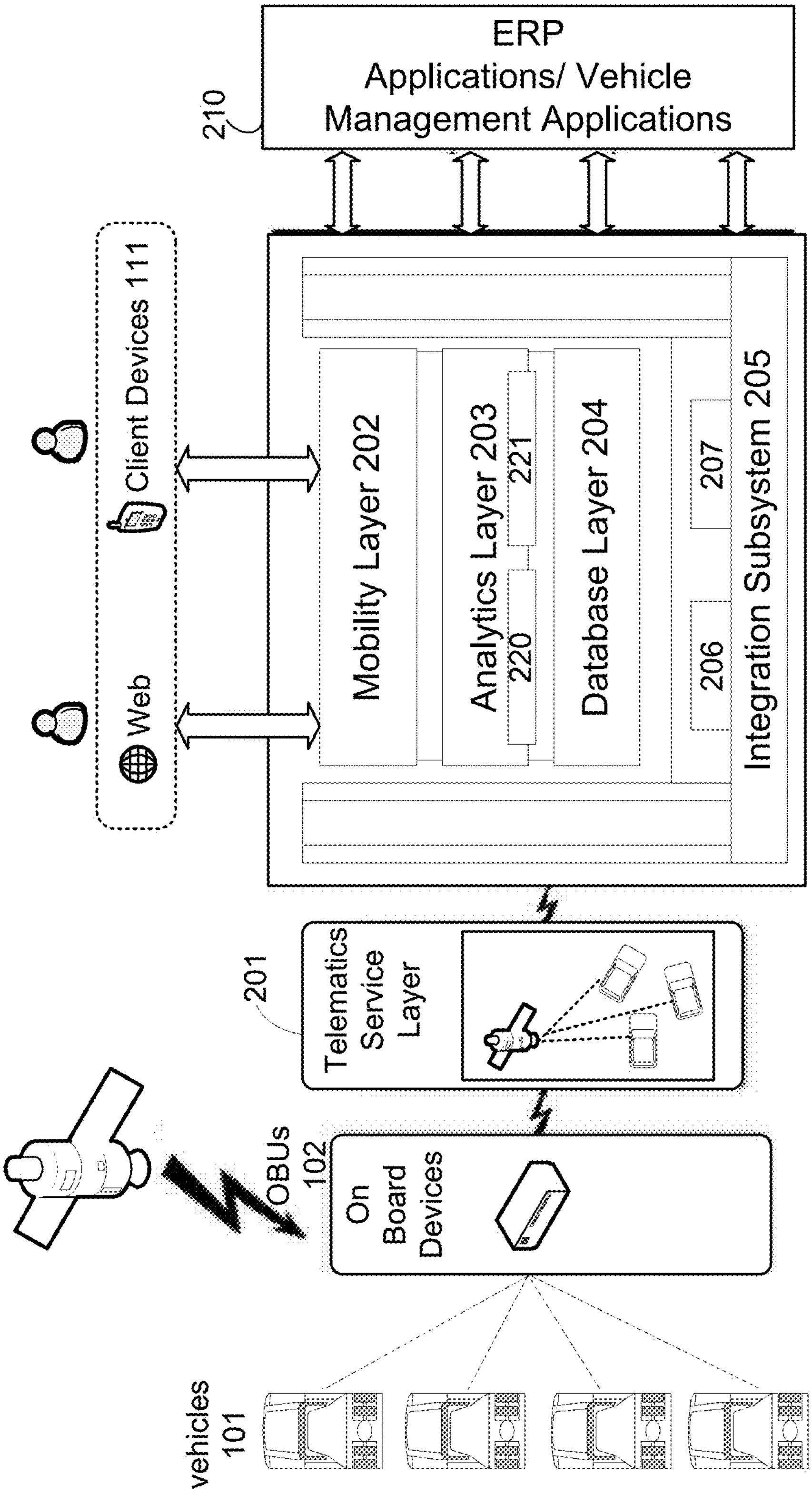
FIG. 2 illustrates architecture of the integrated fleet vehicle management system, according to an embodiment.

FIG. 2 shows the architecture of the system 100. The vehicles 101 and the OBUs 102 are shown. As discussed above, the OBUs 102 record events occurring in the vehicles 102. The data from the OBUs 102 is referred to as OBU data, telematics data, vehicle data or vehicle state data. Multiple layers in the architecture are shown.

A layer includes a platform and at least one application. An application is software comprised of machine readable instructions stored on a non-transitory computer readable medium and executable by a processor. The layers shown in FIG. 2 may be implemented by the corresponding servers shown in FIG. 1.

A platform is an environment that an application is designed to run on. The platform for example includes hardware to execute the application, an operating system (OS), and runtime libraries. The application may be compiled to run on the platform. The runtime libraries may include low-level routines called by the application to invoke some of the behaviors, such as exception handling, memory management, etc., of the platform at runtime. A subsystem is similar to a platform and includes software and hardware to run the software.

The ERP application may include an application that can be used for vehicle management. For example, an ERP application may be a CRM application that stores service technician information, customer information, vehicle manager information, etc., which may be used for vehicle servicing and alerts. Another example of an ERP application may be a vehicle management application specifically designed to perform a vehicle management task, such as generating a service ticket, which may be based on information provided to the vehicle management application from the database and analytics layer, such as vehicle state data, vehicle ID, etc. An ERP application may be any application that processes data, and the processed data may be associated with vehicle management or business activities.

The ERP application may run on a different platform than the analytics and database layers 203 and 204. The integration subsystem 205 facilitates communication and data transfer between the ERP applications 210 and the analytics and database layers 203 and 204. The analytics and database layers 203 and 204 are shown as different layers but may be provided as a single layer referred to as the database and analytics layer that runs on the same platform.

The telematics service layer 201 receives the OBU data from the OBUs 102 and transfers the OBU data to the analytics layer 203. The analytics layer 203 analyzes the OBU data received via the telematics service layer 201, and OBU data may be fed to the mobility layer 202 and an ERP application, which may be part of the ERP applications 210 for incident creation, such as alerts, maintenance scheduling, etc. The analytics layer 203 processes the OBU data and makes vehicle service and diagnostic determinations, schedules maintenance, manages rental and warranty instances and performs a variety of other functions for managing the vehicles 101.

The analytics layer 203 analyzes the OBU data to determine whether an actionable vehicle event occurs that invokes generation of an action related to the analyzed OBU data. For example, the analytics layer 203 includes a rules module 220 and an action generator 221, which may include machine readable instructions executed by at least one processor. The rules module 220 generates and stores rules, and the rules specify conditions for determining actionable vehicle events. An actionable vehicle event is an event that is detectable from vehicle state data, which may include the OBU data. The actionable event may be associated with health, service, or operation of a vehicle, such as oil pressure below a threshold, location of a vehicle within or outside predetermined geographic area, load of vehicle above a threshold, or any other vehicle-related event. The rules may specify one or more conditions to invoke one or more actions. A simple example of a condition may be a measured metric from the OBU data exceeds a threshold, which invokes an action, such as generating a service ticket. Rules may be generated based on user input. For example, a user may enter rules via the dashboard 110. In another example, a rule may be generated from historic analysis of OBU data, such as determining failure rates of parts based on historic analysis of data, predicting estimated failure from the historic analysis, and creating rules that specify parts maintenance schedules based on estimated failure times.

In another example, rules may be specified by other systems. The action generator 221 determines whether an actionable vehicle event occurs based on at least one of the rules, and may execute an action if the actionable vehicle event is determined to occur. For example, the action generator 221 determines whether a vehicle service is needed based on the vehicle state data and at least one rule.

The action generator 221 may invoke service ticket generation by an ERP application by sending vehicle state data and a request for a service ticket to the ERP application if these actions are specified in the rule. The action generator 221 may execute other actions which may be specified in the rules. For example, the action generator 221 determines whether the vehicle is not being used in accordance with stored parameters based on the vehicle state data and at least one rule. If the vehicle is determined as not being used in accordance with the stored parameters, the action generator 221 generates an alert to a manager determined to be responsible for managing the vehicle. The manager may be determined by communication with an ERP application, and the alert may be generated via the dashboard 10 or sent via email, text message or some other type of message to a client device via the mobility layer 202. Any alerts may be sent in this manner. The parameters may include maximum number of hours of operation, maximum load, or other parameters. These parameters may be specified in service agreements for the vehicles. Detection of the actionable vehicle event may cause the action generator 221 to send an instruction to the vehicle over a network causing the vehicle to shut down. In an example, the instruction may be sent to an OBU as an electronic data interchange (EDI) message. In another example, the action generator 221 determines whether the vehicle is being used outside of a previously agreed upon geographic location based on the vehicle state data (e.g., global positioning data) and at least one rule, and if the vehicle is determined as being used outside of the previously agreed upon geographic location, an alert to a manager determined to be responsible for managing the vehicle is sent.

The database layer 204 stores the OBU data. In one example, the database server 107 may handle both high transaction rates and complex query processing on the stored telematics data. The database layer 204 may include a relational database, online analytical processing, and/or other data storage systems.

The mobility layer 202 provides information regarding the vehicles 101 and OBU data and other equipment-related information from the enterprise applications, which may include dealer enterprise applications, to the Internet and client devices 111. The information may be presented via the dashboard 110 shown in FIG. 1. The mobility layer 202 can also receive information from the client devices 111 and provide the information to the appropriate layer or application. The ERP applications 210 may include CRM and/or other types of applications that may utilize OBU data. The ERP applications 210 may include vehicle management applications that generate service tickets, check warranties to determine whether servicing is covered by warranties, order parts, etc.

The integration subsystem 205 integrates the OBUs 102, the ERP applications 210 and the layers 202-204 and may include the middleware 104 shown in FIG. 1. The integration subsystem 205 provides the capability to connect to other applications through different types of adapters built into the framework of the system 100. The integration subsystem 205 may include a mapping and transformation module 206 and a connectivity module 207 comprising machine readable instructions executed by the least one processor. The mapping and transformation module 206 determines a format for the vehicle state data according to the destination and a source of the vehicle state data, and transforms the vehicle state data to the determined format. For example, mappings between sources and destinations may be stored in data storage for the integration subsystem 205. The mappings may include fields for data from a source and fields for the destination. For example, fields for OBU data are determined. The fields may vary depending on the manufacturer of the OBU. Fields for the destination are determined. For example, the database layer 204 may store have a set of fields for storing OBU data in the database. The ERP applications 210 may have a different set of fields. Some of the fields between the different platforms may be the same but some may be different. The mappings specify how to map fields from the source to the destination. The mappings may specify field name, data type (e.g., integer, ASCII, etc.), field length, etc. The OBU data may be sent to one or multiple destinations, such as the database layer 204 and an ERP application. For each destination, the mapping and transformation module 206 converts the format of the OBU data to the destination format as specified in the stored mappings for the source and destination, and the integration subsystem 205 sends the formatted data to the destination.

The connectivity module 207 determines connectivity parameters to establish communication with the destination. Connectivity parameters may be stored for each destination. The connectivity parameters may specify a communication protocol used by the destination. Based on the type of connectivity and the communication protocol to be used during message transfer between systems, the connectivity module 207 may select a relevant adapter to establish communication between the systems. Some examples of the adapters used by the integration subsystem 205 are now described.

A file adapter provides file based connectivity between applications. This adapter also enables connecting to file servers through the file transfer protocol to push and pull information to and from the file server. A web service adapter provides Internet-based connectivity based on the Simple Object Access Protocol (SOAP), and can be used to communicate with any external web application. A database adapter provides ability to communicate directly to any database of external or internal applications through, for example, Java Database Connectivity (JDBC). This adapter can be used when connecting to legacy systems or other incompatible systems that may be hosted on different platforms that use different protocols. Some examples of modules and mechanisms that may be used for connectivity in the system 100 are a Remote Function Call (RFC), which is a call or remote execution of a remote function module in an external system, utilization of a document format for data transfers, and proxies, which are executable interfaces that are generated for the target application language, such as JAVA or ABAP.

Figure 3:
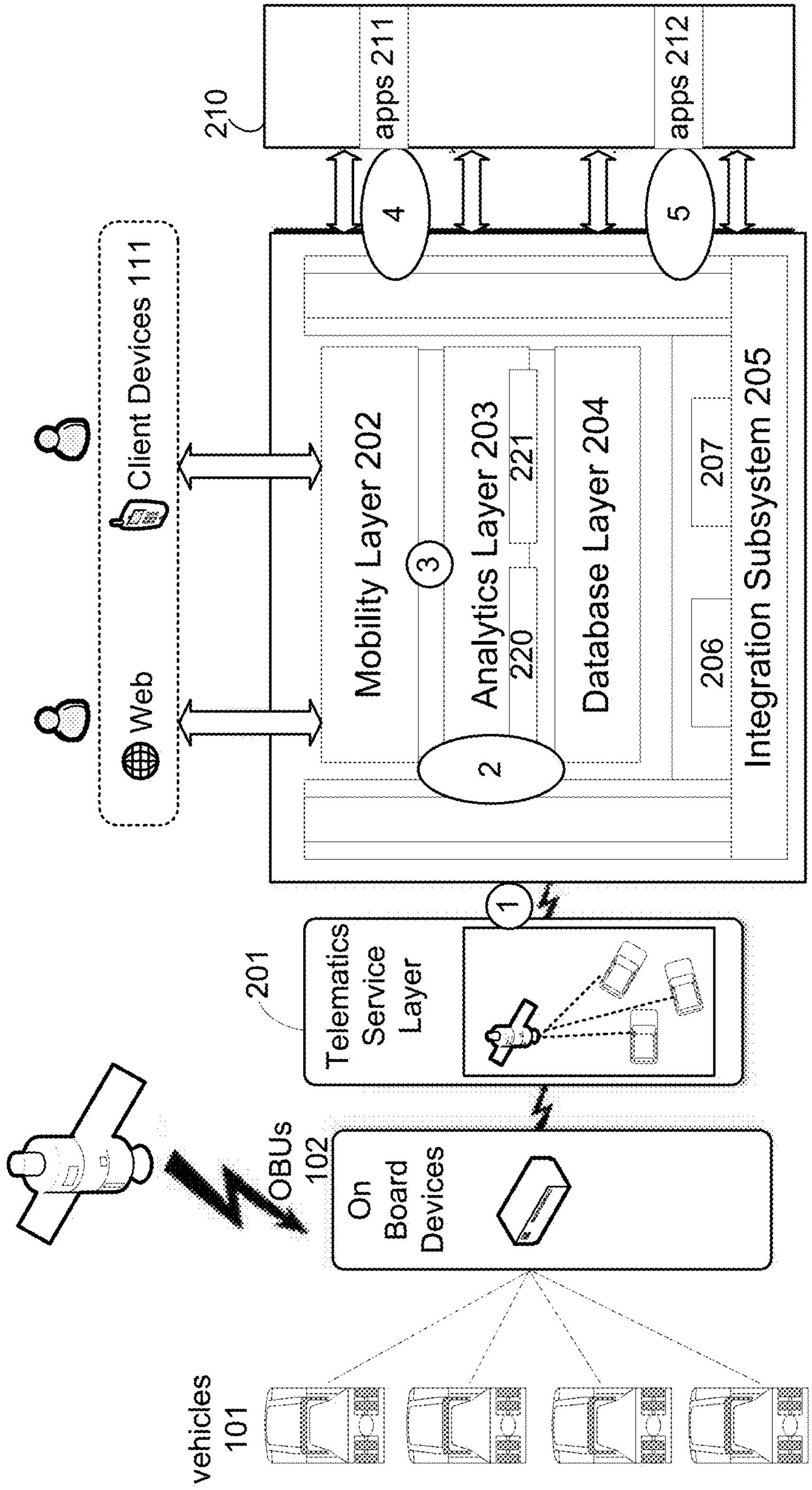
FIG. 3 illustrates connectivity touch points, according to an embodiment.

FIG. 3 shows examples of connectivity touch points for the integration subsystem 205. The connectivity touch points are shown as black circles or ovals in FIG. 3 and represent the connections and interfaces between layers, subsystems, applications, etc. The connections and interfaces for the connectivity touch points may be provided by the integration subsystem 205 and/or the platforms for the sources and destinations. Connectivity touch point 1 is between the telematics layer 201 and the integration subsystem 205. In one example, the connections are provided through web-service-based connectivity. For example, data transfer between the telematics service layer 201 and the integration subsystem 205 is through a web service using SOAP. In this case, the web service may be created and published in an application integration system, which can act as a web service provider. A Web Services Description Language (WSDL) file describing the functionality of the web service and a SOAP action URL may be stored and used by the telematics service layer 201 for connecting to the integration subsystem 205.

In another example, the connections for connectivity touch point 1 are file-based. For example, data from the telematics service layer 201 is provided in the form of files. A server for the telematics service layer 201 is configured with details, such as an Internet Protocol (IP) address and access credentials, and the FTP protocol is used to transfer files to a server of the integration subsystem 205.

Connectivity touch point 2 is between the integration subsystem 205 and the analytics layer 203, the mobility layer 202, and the database layer 204. The analytics layer 203 and the database layer 204 may be provided as a single layer hosted on the same platform. The connectivity may depend on the type of platform or application. If the layers are hosted by the same platform, such as all applications provided on a SAP™ platform, then a web service proxy may be used, and information can be exchanged between applications synchronously and asynchronously. If hosted by different platforms, a web service or direct database connectivity through a JDBC adapter may be used.

Connectivity touch point 3 is between the analytics layer 203 and the mobility layer 202. When both analytics and mobility layer are on the same platform, direct communication can be established between these applications through native connectivity without the need of integration middleware. If hosted by different platforms, a web service or a JDBC adapter may be used.

Connectivity touch points 4 and 5 are between the integration subsystem 205 and applications that may be provided as applications 210. For example, the applications 210 may include ERP applications hosted on the same platform as the layers 202-204, and these applications are shown as apps 211 and connections are represented by connectivity touch point 4. In this case, the connections may use the connectivity protocol and formats of the platform. Connectivity touch point 5 represents connections to apps 212 which may be hosted on a different platform than the layers 202-204, and adapters specific to the different platform may be used for the connections. Connectivity touch point 6, between the mobility layer 202 and the client devices 111, may be facilitated by a web service managed by the mobility layer 202.

Figure 4:
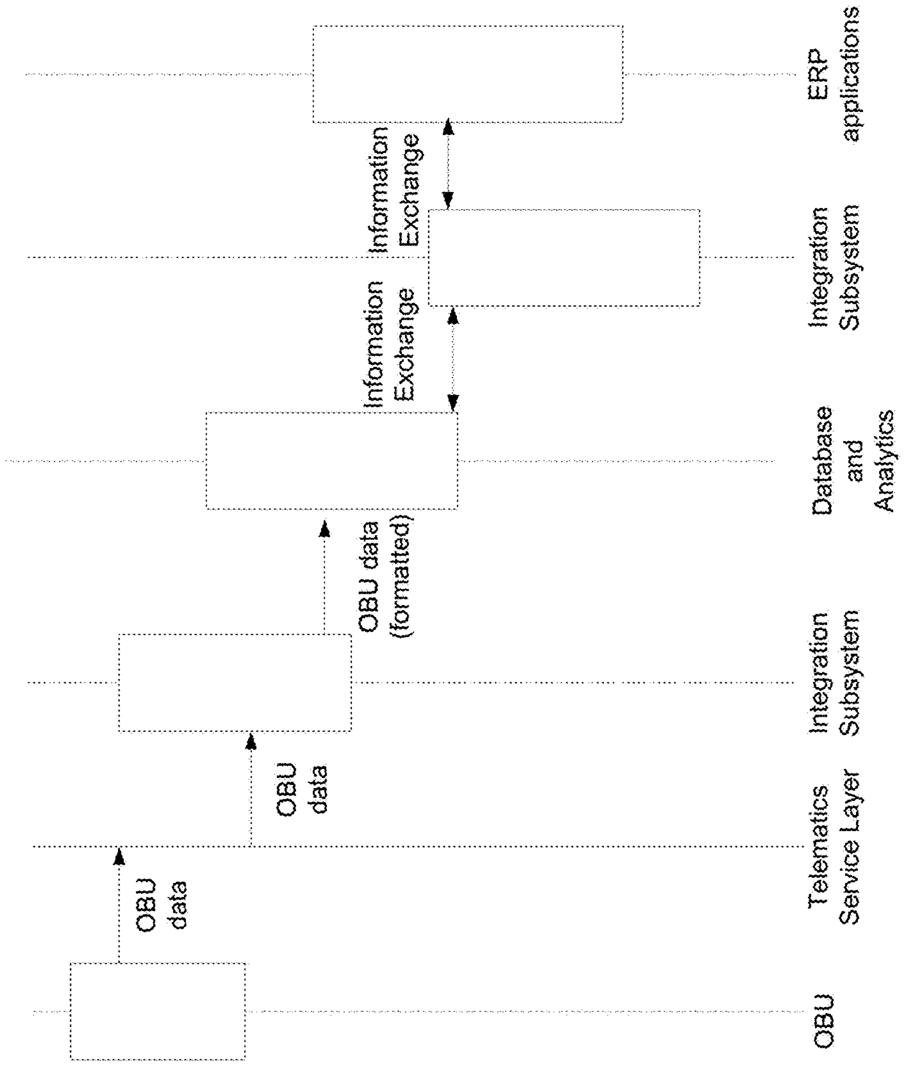
FIG. 4 illustrates a data flow diagram showing information sent between components, according to an embodiment.

FIG. 4 shows a data flow diagram illustrating some of the information sent between components shown in FIGS. 1 and 2. The OBUs 102 send OBU data to the telematics service layer 201. The telematics service layer 201 sends the OBU data to the analytics and database layers 203 and 204 via the integration subsystem 205. The integration subsystem 205 formats the OBU data for storage in the database layer 204. Another destination for the OBU data may be an ERP application, and the data may be formatted for the ERP application. The analytics layer 203 may determine whether an actionable vehicle event occurs from vehicle state data comprising the OBU data, and execute an action based on at least one rule. The action may invoke an information exchange between the analytics and database layers 203 and 204 and the ERP application via the integration subsystem 205. The subsystem 205 facilitates the information exchange through determined connectivity parameters and formatting for the destination, for example, performed by mapping and transformation module 206 and the connectivity module 207. The information exchange may include sending vehicle state data from the analytics and database layers 203 and 204 and a request to generate a service ticket based on the vehicle state data to the ERP application. The ERP application may generate a service ticket and identify a service technician to perform the service from a CRM application and send the service ticket with service technician information via the integration subsystem 205 to the analytics and database layers 203 and 204. The analytics and database layers 203 and 204 may retrieve additional information associated with the service ticket, such as specific OBU data related to the vehicle to be serviced. Although not shown, the service ticket and the additional information may be provided to the service technician via the dashboard 110. The dashboard 110 may be accessed by client devices 111. Also, alerts or other messages may be sent to the client devices 111.

The system 100 facilitates authentication of users for the system 100 and the ERP applications 210. Authentication may be performed by the mobility layer 202 via the dashboard 110. A user may provide login and password information via the dashboard 110. Access control lists may be stored for the system 100 and ERP applications 210 to determine whether a user is authorized to access information from those sources.

The analytics and database layers 203 and 204 can detect incidents based on the collected OBU data and facilitate generation of service tickets. The OBU data may include error codes that identifies problems of a vehicle and may be stored as an actionable vehicle event. Also, the analytics and database layers 203 and 204 may use rules to identify incidents that are actionable vehicle events that warrant actions to rectify the incidents. Occurrence of an actionable event may be stored in the database layer 204. Also, a service ticket may be generated for the incident by an ERP application, for example, in response to a request for a service ticket generated by the analytics and database layers 203 and 204 and sent to the ERP application.

Figure 5:
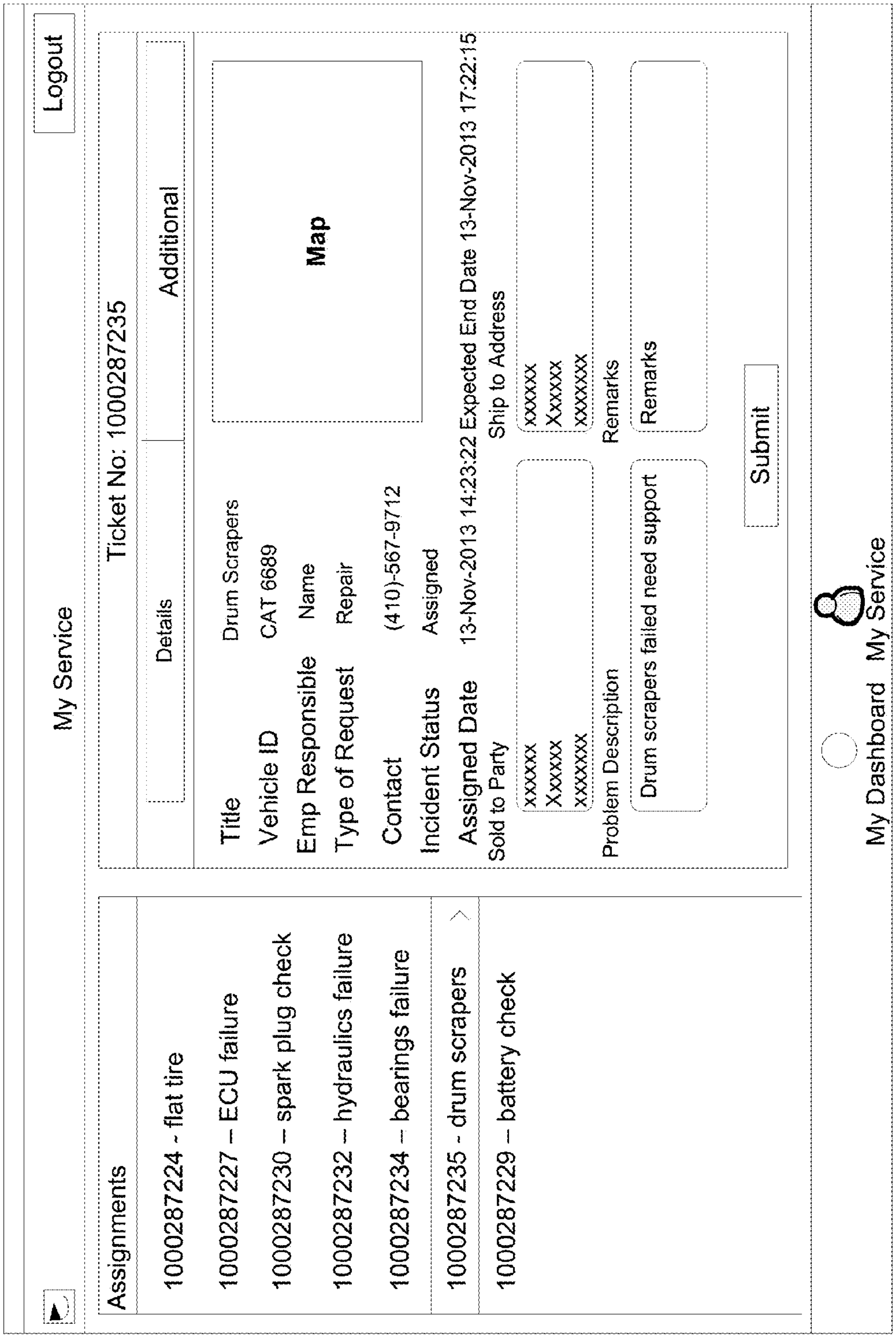
FIGS. 5-8 show examples of screenshots that may be shown in a dashboard, according to embodiments.

FIG. 5 shows an example of a screen in the dashboard 110 that includes service ticket information. The service ticket information may be viewed by a manager or a service technician. If a service technician is logged in, only the tickets for the service technician may be shown. Service ticket numbers are shown on the left. A service ticket from the left may be selected to display additional information about service ticket, such as vehicle ID, employee or service technician responsible for the service, type of service request, contact information, incident status, and dates for when the service ticket was assigned and when the service is to be completed. A problem description may also be provided.

The service tickets may be prioritized and given a status, such as very high, high, medium and low. Actions to be taken, such as servicing the vehicle, may be scheduled based on status and priority. The scheduling may be done by the ERP application and provided to the analytics and database layers 203 and 204, which can present the schedules via the dashboard 110. The dashboard 110 facilitates scheduling and prioritizing of incidents for service technicians that service the vehicles 101. Service tickets generated for incidents may be generated by an ERP application. The information for the service tickets and additional vehicle information can be viewed via the dashboard 110. A status of each service ticket is shown, and geographic location of the vehicle and working condition of the vehicle is shown. The service tickets may be prioritized based on service agreements and past incidents.

Figure 6:

FIG. 6 shows an example of a screen in the dashboard 110 that shows service tickets by priority. High priority tickets may be shown in the upper part of the screen and lower and medium priority tickets may be shown in the lower part of the screen. The ticket number, description, status and location are shown. A user may click on the map button to get a map to the vehicle.

The analytics and database layers 203 and 204 track the status of the service tickets, such as whether the service has been performed, when the service was performed, what service was performed, and by whom. This information is stored in the database layer 204 and provided to the ERP application.

Management of routine maintenance of the vehicles 101 is also performed by the system 100. For example, a manager logs into the system 100 via the dashboard 110 to create and monitor scheduled maintenance, or the schedule is provided by an ERP application to the analytics and database layers 203 and 204, which saves the schedule. The schedule is available for view via the dashboard 110. Each service technician can login to view the schedule and the scheduled maintenance is tracked.

Information about the vehicle and scheduled maintenance can be viewed via the dashboard 110. The information may include graphical and quantitative information on the vehicle usage, which may include information for the fuel system, hydraulics, manufacturer, oil, buck draw capacity, lubrication system, etc. The information may include additional information regarding the history of failures and fixes for past failures.

Fleet tracking is performed by the system 100. For example, global position system (GPS) data are sent by the OBUs 102 in the OBU data and stored in the data storage layer 204 with the other OBU data for the vehicle. The tracking data can be shown on a screen in the dashboard 110. The tracking data may include location of a vehicle on a map, route tracking, distance traveled, driving time, idle time, average speed, etc. Other tracking data may include number of vehicles for each of a plurality of locations.

Figure 7:
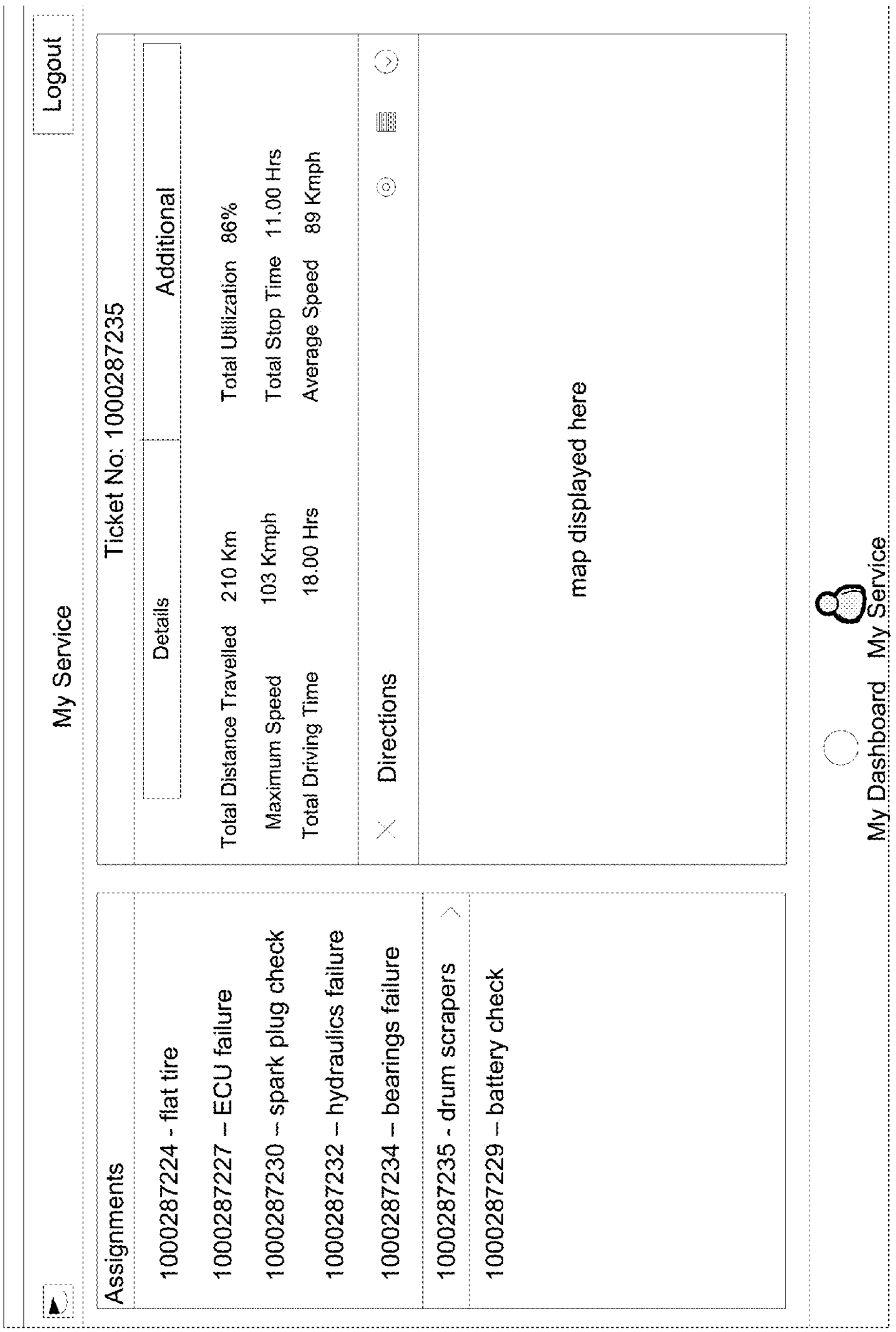

FIG. 7 shows an example of a screen in the dashboard 110 that includes vehicle tracking information. Service tickets are shown on the left. A user may click on the service ticket to get vehicle tracking information, driving summary and other information.

The analytics and database layers 203 and 204 may determine, from the GPS data, whether a vehicle is in a location outside an authorized location. For example, a service agreement for a vehicle may specify that it can only be used in a predetermined geographic area. The analytics and database layers 203 and 204 determine from the GPS data whether the vehicle is being used outside the predetermined geographic area, and can generate alerts accordingly.

The analytics and database layers 203 and 204 also determine utilization of each vehicle from the OBU data. The OBU data is analyzed to determine health of machines, need for support, spare parts replacement, overhaul information and running and idle time. The health and running time indicates productivity, which directly contributes to information on breakeven and return on investment for machine owners. The analytics layer 204 can make predictions on when maintenance is needed based on utilization and historic analysis of OBU data and failures. The maintenance is then automatically scheduled. Utilization information can be presented via a screen in the dashboard 110.

Figure 8:
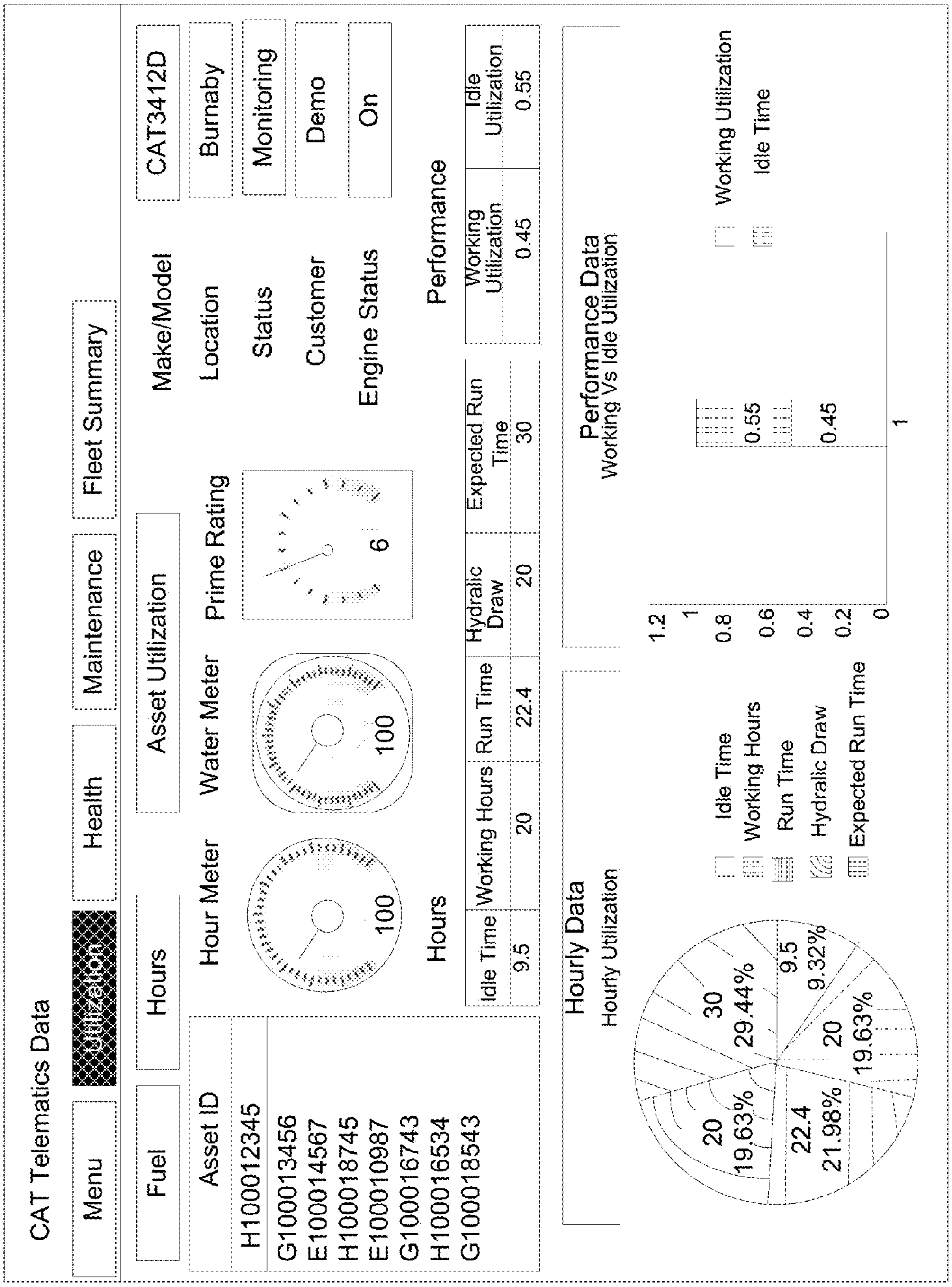

FIG. 8 shows an example of a screen in the dashboard 110 that includes utilization information. Asset IDs are shown, which may be a unique ID assigned to each vehicle. A user may select an asset ID to display the utilization information for the vehicle. Information, such as make and model, location, status, customer and engine status is shown. Hours of vehicle utilization are shown and a percentage of time the vehicle is utilized and idle are shown.

Figure 9:
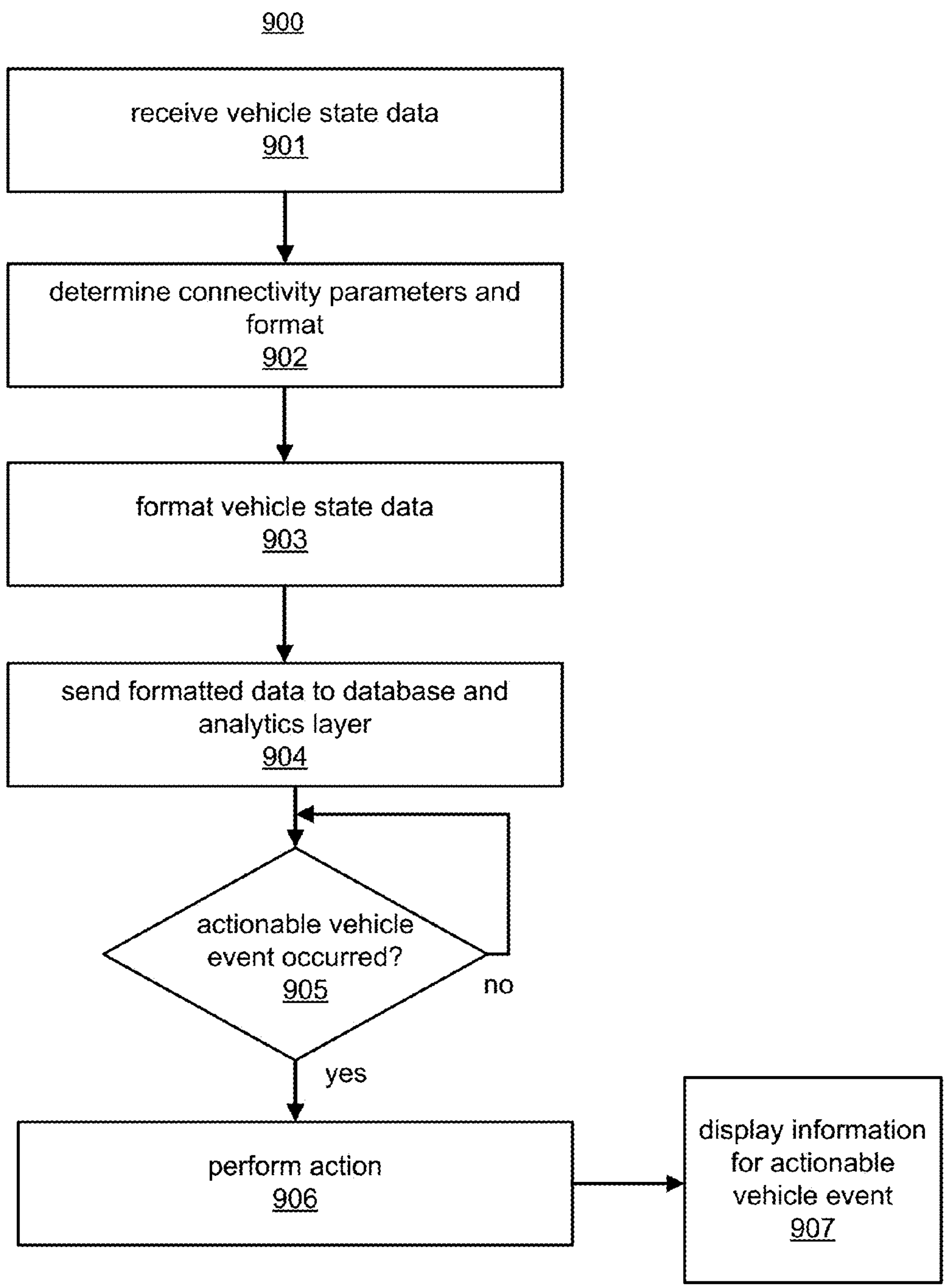
FIG. 9 illustrates a flowchart of a method of integrated fleet vehicle management, according to an embodiment.

FIG. 9 illustrates a flowchart of a method 900 of integrated fleet vehicle management. The method 900 is described as performed by the system 100 shown in FIGS. 1-3 but the method 900 may be performed by other systems. The method 900 includes information exchange between the layers 202-204 and the ERP applications 210 facilitated by the integration subsystem 205.

At 901, the integration subsystem 205 receives vehicle state data from the telematics server 103, which collects the vehicle state data, e.g., OBU data, from the OBUs 102. At 902, the integration subsystem 205 determines connectivity parameters and a format for storing data in the database layer 204. The connectivity parameters and format may be stored for multiple destinations and the integration subsystem 205 may retrieve the connectivity parameters and the format for a particular destination. At 903, the vehicle state data is formatted according to the determined format, and at 904, the formatted vehicle state data is sent to the analytics and database layers 203 and 204 according to the determined connectivity parameters.

At 905, the analytics layer 203 determines whether an actionable vehicle event occurred based on the vehicle state data and at least one rule. For example, the rules module 220 generates and stores rules, and the rules specify conditions for determining actionable vehicle events. The action generator 221 determines whether an actionable vehicle event occurs based on at least one of the rules, and may execute an action if the actionable vehicle event is determined to occur. For example, the action generator 221 determines whether a vehicle service is needed based on the vehicle state data and at least one rule.

At 906, if an actionable vehicle event is detected, then an action may be performed related to the actionable vehicle event. The relevant rule may specify the action. For example, the action may be to invoke service ticket generation by an ERP application. The action generator 221 sends the vehicle state data for the detected actionable vehicle event and a request for a service ticket to the ERP application via the integration subsystem 205. The integration subsystem 205 determines the connectivity parameters for the ERP application and formats the vehicle state data for the ERP application if needed, and sends the request and formatted data to the ERP application. The ERP application determines a service technician to assign the service ticket and generates the service ticket and sends the service ticket to the analytics and database layers 203 and 204, where the service ticket information may be stored.

At 907, information for the actionable vehicle event is displayed via the dashboard 110. For example, the service ticket and additional vehicle information related to the service ticket is presented via the dashboard 110. The additional vehicle information may be retrieved from the database layer 204 and may include service history and other information related to the vehicle in the service ticket.

At 905, if an actionable event is determined not to have occurred, future vehicle state data is monitored. For example, the OBUs 102 may periodically send vehicle state data, and the formatted vehicle state data may be periodically sent to the database and analytics layer 204 and 203. The analytics layer 204 may periodically make the determination of whether an actionable vehicle event occurred based on new vehicle state data and/or historic vehicle state data.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An integrated vehicle management system comprising:

a telematics server that receives vehicle state data from an onboard unit of the vehicle, wherein the vehicle state data is transmitted from the vehicle over a wireless network to the telematics server, and the telematics server stores connectivity parameters for at least one of web-service-based connectivity and file-based connectivity to connect to an integration subsystem and transmit the vehicle state data to the integration subsystem;

the integration subsystem comprising at least one processor and a mapping and transformation module and a connectivity module executed by the at least one processor, wherein the integration subsystem determines a destination of the vehicle state data, and the destination comprises at least one of a database and analytics layer and an enterprise resource planning (ERP) application associated with vehicle management and hosted on a different platform from the database and analytics layer, and the mapping and transformation module:

determines a format for the vehicle state data according to the at least one of the database and analytics layer and the ERP application associated with vehicle management, and a source of the vehicle state data, maps fields from the source of the vehicle state data to corresponding fields in the destination, the fields comprising a data type field; and transforms the vehicle state data to the determined format, based on the mapping;

the connectivity module determines connectivity parameters to establish communication with the destination, wherein the connectivity module establishes a communication between the integration subsystem and the destination by selecting an adapter, the establishing a communication based on the connectivity parameters and a compatibility of the integration subsystem with a connectivity type, and the adapter being one of:

a file adapter for file-based connectivity, a web service adapter for web-service-based connectivity, and a database adapter for database based connectivity; and the database and analytics layer includes data storage and stores the vehicle state data in the data storage, and determines whether an actionable vehicle event occurs from the vehicle state data, wherein the actionable vehicle event is associated with service or use of the vehicle, and in response to determining the actionable vehicle event occurred, the database and analytics layer:

transmitting information for the actionable vehicle event to the ERP application via the integration subsystem, and receiving a service ticket generated by the ERP application via the integration sub system, wherein the database and analytics layer retrieves, from the data storage vehicle, information related to the service ticket; and a mobility server transmitting the service ticket and vehicle information to a remote computer via a network.

2. The integrated vehicle management system of claim 1, wherein to transmit the information for the actionable vehicle event to the ERP application via the integration subsystem, the integration subsystem determines the platform for the ERP application, and determines the connectivity parameters and the format based on the determined platform, and to receive the service ticket at the database and analytics layer via the integration subsystem, the integration subsystem formats the service ticket for storage in the data storage of the database and analytics layer, and sends the service ticket according to the connectivity parameters, wherein the connectivity parameters are determined for the database and analytics layer.

3. The integrated vehicle management system of claim 1, wherein the connectivity module determines whether the integration subsystem is compatible with the web-service-based connectivity or the file-based connectivity, and in response to determining compatibility with the web-service-based connectivity, the connectivity module determines a network address of the web service and sends a request to the web service to determine information for communicating with the integration subsystem; and in response to determining compatibility with the file-based connectivity, the connectivity module determines a network address of a file server of the integration subsystem, and uses a file transfer protocol to transfer the vehicle state data as files to the file server.

4. The integrated vehicle management system of claim 1, wherein the mobility server provides the service ticket and the vehicle information to the remote computer via a dashboard comprising a graphical user interface, and the mobility server receives a drill-down query for additional information for the vehicle via the dashboard from a user, authenticates the user, and sends the query to the analytics and database layer to retrieve the additional information for the vehicle if the user is authenticated, wherein the mobility server presents the additional information via a screen in the dashboard if the user is authenticated.

5. The integrated vehicle management system of claim 1, wherein the database and analytics layer includes a rules module and an action generator executed by at least one processor, wherein the rules module generates and stores rules based on user input, and the rules specify conditions for determining actionable vehicle events, and the action generator determines whether the actionable vehicle event occurs based on at least one of the rules.

6. The integrated vehicle management system of claim 5, wherein the action generator determines whether a vehicle service is needed based on the vehicle state data and the at least one rule.

7. The integrated vehicle management system of claim 6, wherein the action generator invokes generation of the service ticket by the ERP application, and provides the vehicle information and the service ticket to a service technician via a dashboard provided by the mobility server.

8. The integrated vehicle management system of claim 5, wherein the action generator determines whether the vehicle is not being used in accordance with stored parameters based on the vehicle state data and the at least one rule, and if the vehicle is determined as not being used in accordance with the stored parameters, generates an alert to a manager determined to be responsible for managing the vehicle.

9. The integrated vehicle management system of claim 8, wherein the action generator sends an instruction to the vehicle over a network causing the vehicle to shut down.

10. The integrated vehicle management system of claim 5, wherein the action generator determines whether the vehicle is being used outside of a previously agreed upon geographic location based on the vehicle state data and the at least one rule, and if the vehicle is determined as being used outside of the previously agreed upon geographic location, generate an alert to a manager determined to be responsible for managing the vehicle.

11. An integrated fleet vehicle management system comprising:

an integration subsystem that interfaces a telematics server providing vehicle state data from a plurality of vehicles with a database and analytics layer platform, and that interfaces the database and analytics layer platform with an ERP platform, wherein the integration subsystem receives the vehicle state data from a telematics server collecting the vehicle state data from onboard units of the plurality of vehicles, and the integration subsystem comprises at least one processor and a mapping and transformation module and a connectivity module executed by the at least one processor, wherein the integration subsystem determines a destination of the vehicle state data, the destination comprising at least one of the database and analytics layer platform and the ERP platform, wherein the ERP platform hosts an ERP application associated with vehicle management, the connectivity module determines connectivity parameters to establish communication with the destination, wherein the connectivity module is to establish a communication between the integration subsystem and the destination by selecting an adapter, the establishing a communication based on the connectivity parameters and a compatibility of the integration subsystem with a connectivity type, wherein the adapter is one of a file adapter for file-based connectivity, a web service adapter for web-service-based connectivity, and a database adapter for database based connectivity, and the mapping and transformation module, determines a format for the vehicle state data according to the at least one of the database and analytics layer and the ERP platform, and a source of the vehicle state data;

maps fields from the source of the vehicle state data to corresponding fields in the destination, the fields comprising a data type field; and transforms the vehicle state data to the determined format, based on the mapping;

the database and analytics layer includes data storage and stores the vehicle state data in the data storage and determines whether an actionable vehicle event occurs from the vehicle state data, wherein the actionable vehicle event includes at least one of detection of a vehicle state that invokes generation of a service ticket, a determination that any of the plurality of vehicles is not being used in accordance with stored parameters, and a determination that any of the plurality of vehicles is being used outside of a previously agreed upon geographic location, and in response to determining the actionable vehicle event occurred, generating information related to the actionable vehicle event; and a mobility server providing the information related to the actionable vehicle event in a dashboard comprising a graphical user interface to a remote computer via a network.

12. The integrated fleet vehicle management system of claim 11, wherein to invoke generation of the service ticket, the database and analytics layer sends the vehicle state data to the ERP application via the integration subsystem and a request to generate a service ticket, and the ERP application generates the service ticket based on the vehicle state data.

13. The integrated fleet vehicle management system of claim 12, wherein the integration subsystem determines the connectivity parameters and the format based on the ERP platform to receive the vehicle state data.

14. The integrated fleet vehicle management system of claim 12, wherein the ERP application sends the service ticket to the database and analytics layer via the integration subsystem.

15. The integrated fleet vehicle management system of claim 14, wherein the integration subsystem determines the connectivity parameters for the database and analytics layer and sends the service ticket to the database and analytics layer according to the determined connectivity parameters.

16. The integrated fleet vehicle management system of claim 12, wherein the mobility server provides the service ticket and the vehicle information to the remote computer via the dashboard, and the mobility server receives a drill-down query for additional information for the vehicle via the dashboard from a user, authenticates the user, and sends the query to the analytics and database layer to retrieve the addition information for the vehicle if the user is authenticated, wherein the mobility server presents the additional information via a screen in the dashboard if the user is authenticated.

17. The integrated fleet vehicle management system of claim 11, wherein the database and analytics layer includes a rules module and an action generator executed by at least one processor, wherein the rules module generates and stores rules based on user input, and the rules specify conditions for determining actionable vehicle events, and the action generator determines whether to execute actionable vehicle event occurs based on at least one of the rules.

18. A method of integrated fleet vehicle management comprising:

receiving, at an integration subsystem, vehicle state data from a telematics server collecting vehicle state data from onboard units of a plurality of vehicles;

determining connectivity parameters and a format for storing data in a database and analytics layer platform;

formatting the vehicle state data for the database and analytics layer platform based on transforming the vehicle state data to the format determined for the database and analytics layer platform, wherein the formatting comprises mapping fields from the source of the vehicle state data to corresponding fields in the destination, the fields comprising a data type field;

sending the formatted vehicle state data to the database and analytics layer platform according to the connectivity parameters, wherein sending comprises establishing a communication between the integration subsystem and the destination by selecting an adapter, the establishing a communication based on the connectivity parameters and a compatibility of the integration subsystem with a connectivity type, wherein the adapter is one of a file adapter for file-based connectivity, a web service adapter for web-service-based connectivity, and a database adapter for database based connectivity;

determining, at the database and analytics layer, whether a vehicle service is needed based on the vehicle state data and at least one rule;

in response to determining the vehicle service is needed, sending a request for a service ticket and the vehicle state data to an ERP application hosted on an ERP platform different from the database and analytics layer platform via the integration subsystem, wherein the integration subsystem formats the vehicle state data for the ERP platform and sends the vehicle state data formatted for the ERP to the ERP platform according to connectivity parameters for the ERP platform;

receiving, at the database and analytics layer platform, the service ticket from the ERP application via the integration subsystem, wherein the integration subsystem sends the service ticket according to connectivity parameters for the database and analytics layer platform; and presenting the service ticket and vehicle information related to the service ticket via a dashboard, comprising a graphical user interface, over the Internet.

19. The method of claim 18, comprising:

determining, at a connectivity module, whether the integration subsystem is compatible with web-service-based connectivity or file-based connectivity, and in response to determining compatibility with the web-service-based connectivity, determining a network address of the web service and sending a request to the web service to determine information for communicating with the integration subsystem; and in response to determining compatibility with the file-based connectivity, determining a network address of a file server of the integration subsystem, and transferring the vehicle state data as files to the file server according to a file transfer protocol.

20. The method of claim 18, comprising:

receiving, at the dashboard, a drill-down query for additional information for a vehicle related to the service ticket from a user;

authenticating the user;

sending the query to the analytics and database layer platform to retrieve the additional information for the vehicle if the user is authenticated; and presenting the additional information via a screen in the dashboard if the user is authenticated.

* * * * *